US011259455B2

(12) United States Patent
Johnson et al.

(10) Patent No.: US 11,259,455 B2
(45) Date of Patent: Mar. 1, 2022

(54) SYSTEM AND METHOD FOR CONTROLLING THE OPERATION OF A RESIDUE REMOVAL DEVICE OF A SEED-PLANTING IMPLEMENT BASED ON A RESIDUE CHARACTERISTIC OF THE FIELD

(71) Applicant: CNH Industrial America LLC, New Holland, PA (US)

(72) Inventors: Chad M. Johnson, Arlington Heights, IL (US); Trevor Stanhope, Palos Hills, IL (US); Christopher Schoeny, Yorkville, IL (US)

(73) Assignee: CNH Industrial America LLC, New Holland, PA (US)

( * ) Notice: Subject to any disclaimer, the term of this patent is extended or adjusted under 35 U.S.C. 154(b) by 246 days.

(21) Appl. No.: 16/388,639

(22) Filed: Apr. 18, 2019

(65) Prior Publication Data

US 2020/0329627 A1    Oct. 22, 2020

(51) Int. Cl.
*A01C 5/06* (2006.01)
*A01C 7/06* (2006.01)
(Continued)

(52) U.S. Cl.
CPC .............. *A01C 5/068* (2013.01); *A01B 35/32* (2013.01); *A01B 79/02* (2013.01); *A01C 5/064* (2013.01); *A01C 7/06* (2013.01)

(58) Field of Classification Search
CPC ........... A01C 5/068; A01C 7/06; A01C 5/066; A01C 5/06; A01C 5/00; A01C 7/00;
(Continued)

(56) References Cited

U.S. PATENT DOCUMENTS 8,577,561 B2    11/2013   Green et al.
9,232,687 B2    1/2016    Bassett
(Continued)

FOREIGN PATENT DOCUMENTS

WO    WO 2018/200870    11/2018

OTHER PUBLICATIONS

"Pluribus V-Strip Till," Dawn Equipment, http://www.dawnequipment.com/Strip-Till.html, Feb. 5, 2019, 1 page.
(Continued)

*Primary Examiner* — Christopher J. Novosad
(74) *Attorney, Agent, or Firm* — Rebecca L. Henkel; Rickard K. DeMille

(57) ABSTRACT

In one aspect, a system for controlling the operation of a residue removal device of a seed-planting implement may include a residue removal device configured to remove residue from a path of the seed-planting implement. The system may also include a sensor configured to capture data indicative of a residue characteristic associated with a portion of the field within a detection zone positioned forward of the residue removal device relative to a direction of travel of the seed-planting implement. Furthermore, the system may include a controller communicatively coupled to the sensor. As such, the controller may be configured to monitor the residue characteristic associated with the portion of the field within the detection zone based on data received from the sensor. Additionally, the controller may be further configured to control the operation of the residue removal device based on the monitored residue characteristic.

20 Claims, 4 Drawing Sheets

(51) Int. Cl.
*A01B 79/02* (2006.01)
*A01B 35/32* (2006.01)

(58) Field of Classification Search
CPC ......... A01C 5/064; A01B 35/32; A01B 79/02;
A01B 35/00; A01B 79/00
See application file for complete search history.

(56) References Cited

U.S. PATENT DOCUMENTS

| | | |
|---|---|---|
| 9,282,688 B2 | 3/2016 | Casper et al. |
| 9,516,802 B2 | 12/2016 | Zemenchik |
| 9,814,172 B2 | 11/2017 | Achen et al. |
| 10,165,725 B2 | 1/2019 | Sugumaran |
| 2017/0112043 A1 | 4/2017 | Nair et al. |
| 2018/0114305 A1 | 4/2018 | Strnad et al. |
| 2018/0139892 A1 | 5/2018 | Knobloch et al. |
| 2018/0206393 A1 | 7/2018 | Stoller et al. |
| 2018/0210450 A1 | 7/2018 | Ferrari et al. |
| 2018/0310469 A1 | 11/2018 | Posselius et al. |
| 2019/0029165 A1 | 1/2019 | Leimkuehler et al. |

OTHER PUBLICATIONS

"Row Cleaners," JohnDeere, https://www.deere.com/en_US/parts/parts_by_industry/ag/seeding/row-cleaners/row-cleaners.page. Feb. 5, 2019, 1 page.

```
                                    ┌─202
RECEIVE SENSOR DATA INDICATIVE OF A RESIDUE CHARACTERISTIC ASSOCIATED
WITH A PORTION OF A FIELD WITHIN A DETECTION ZONE POSITIONED FORWARD
OF A RESIDUE REMOVAL DEVICE RELATIVE TO A DIRECTION OF TRAVEL OF A
                    SEED-PLANTING IMPLEMENT

┌─204
MONITOR THE RESIDUE CHARACTERISTIC ASSOCIATED WITH THE PORTION OF THE
FIELD WITHIN THE DETECTION ZONE BASED ON DATA RECEIVED FROM THE SENSOR

┌─206
CONTROL THE OPERATION OF THE RESIDUE REMOVAL DEVICE BASED ON THE
            MONITORED RESIDUE CHARACTERISTIC
```

FIG. 4

SYSTEM AND METHOD FOR CONTROLLING THE OPERATION OF A RESIDUE REMOVAL DEVICE OF A SEED-PLANTING IMPLEMENT BASED ON A RESIDUE CHARACTERISTIC OF THE FIELD

FIELD OF THE INVENTION

The present disclosure generally relates to seed-planting implements and, more particularly, to systems and methods for controlling the operation of a residue removal device of a seed-planting implement based on a residue characteristic of the field across which the implement is traveling.

BACKGROUND OF THE INVENTION

Modern farming practices strive to increase yields of agricultural fields. In this respect, seed-planting implements are towed behind a tractor or other work vehicle to disperse seed throughout a field. For example, seed-planting implements typically include one or more furrow-forming tools or openers that form a furrow or trench in the soil. One or more dispensing devices of the seed-planting implements may, in turn, deposit the seeds into the furrow(s). After deposition of the seeds, a furrow-closing assembly may close the furrow in the soil and a packer wheel may pack the soil on top of the deposited seeds.

In certain configurations, a seed-planting implement may include one or more residue removal devices configured to break up and sweep away residue and dirt clods present on the field surface within the path of the implement. In general, increasing the pressure applied to the soil by the residue removal device(s) may increase the amount of residue that the device(s) sweeps away. However, when too much pressure is applied to the soil by the residue removal device(s), the device(s) may excessively engage the moist, nutrient-rich top soil and sweep it away from the location of the furrow(s), thereby causing accumulation of mud/debris on the residue removal device(s), poor seed germination rates, and/or stunted crop growth. Conversely, when too little pressure is applied to the soil by the residue removal device(s), there is a greater chance the residue may enter the furrow(s). The presence of residue within the furrow may similarly result in poor seed germination rates, slower emergence rates, and/or stunted crop growth.

Accordingly, an improved system and method for controlling the operation of a residue removal device of a seed-planting implement based on a residue characteristic of the field would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for controlling the operation of a residue removal device of a seed-planting implement. The system may include a residue removal device configured to remove residue from a path of the seed-planting implement. The system may also include a sensor configured to capture data indicative of a residue characteristic associated with a portion of the field within a detection zone positioned forward of the residue removal device relative to a direction of travel of the seed-planting implement. Furthermore, the system may include a controller communicatively coupled to the sensor. As such, the controller may be configured to monitor the residue characteristic associated with the portion of the field within the detection zone based on data received from the sensor. Additionally, the controller may be further configured to control the operation of the residue removal device based on the monitored residue characteristic.

In another aspect, the present subject matter is directed to a seed-planting implement that may include a toolbar. The seed-planting implement may also include a first row unit coupled to the toolbar, with the first row unit having a first residue removal device configured to remove residue from a path of the first row unit. Furthermore, the seed-planting implement may include a second row unit coupled to the toolbar, with the second row unit having a second residue removal device configured to remove residue from a path of the second row unit. Moreover, the seed-planting implement may include a sensor configured to capture data indicative of a residue characteristic associated with a portion of the field within a detection zone positioned forward of the first residue removal device and the second residue removal device relative to a direction of travel of the seed-planting implement. Additionally, the seed-planting implement may include a controller communicatively coupled to the sensor. As such, the controller may be configured to monitor the residue characteristic associated with the portion of the field within the detection zone based on data received from the sensor. In addition, the controller may be further configured to control the operation of at least of the first residue removal device or the second residue removal device based on the monitored residue characteristic.

In a further aspect, the present subject matter is directed to a method for controlling the operation of a residue removal device of a seed-planting implement. The method may include receiving, with a computing device, sensor data indicative of a residue characteristic associated with a portion of the field within a detection zone positioned forward of the residue removal device relative to a direction of travel of the seed-planting implement. The method may also include monitoring, with the computing device, the residue characteristic associated with the portion of the field within the detection zone based on received sensor data. Furthermore, the method may include controlling, with the computing device, the operation of the residue removal device based on the monitored residue characteristic.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which:

FIG. 4 illustrates a flow diagram of one embodiment of a method for controlling the operation of a residue removal device of a seed-planting implement in accordance with aspects of the present subject matter.

Figure 1:
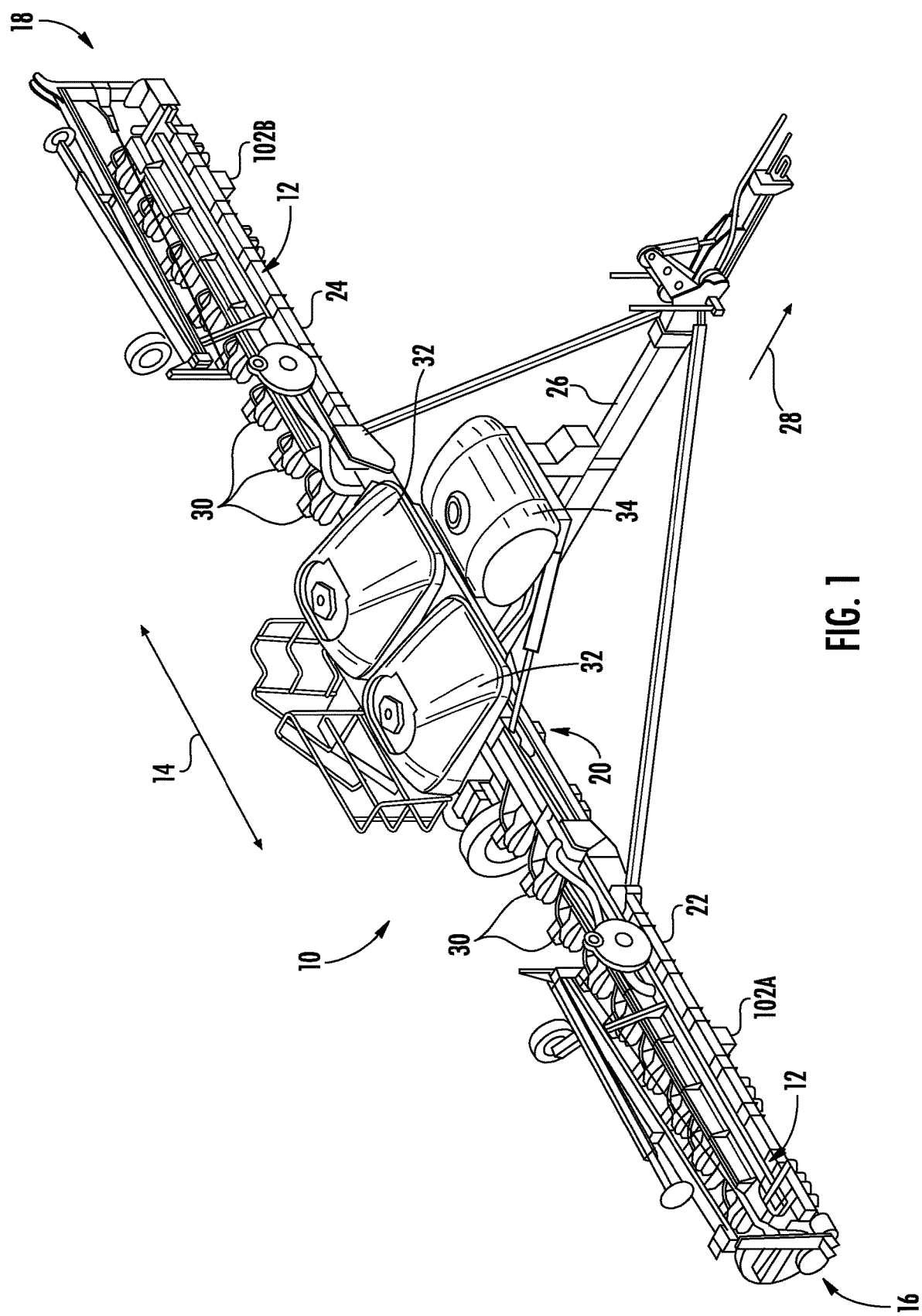
FIG. 1 illustrates a perspective view of one embodiment of a seed-planting implement in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for controlling the operation of a residue removal device of a seed-planting implement. Specifically, in several embodiments, a controller of the disclosed system may be configured to receive data from a sensor as the implement is moved across a field. The sensor may, in turn, be configured to capture data indicative of one or more residue characteristic(s) (e.g., a percent residue coverage and/or a residue size, shape, and/or type) associated with a portion of the field within a detection zone positioned forward of the residue removal device. In this regard, the detection zone may correspond to the portion of the field in which the residue removal device will be present with continued forward movement of the implement. As such, the controller may be configured to monitor the residue characteristic(s) of the portion of the field in front of the residue removal device based on the data received from the sensor.

In accordance with aspects of the present subject matter, the controller may be configured to control the operation of the residue removal device based on the monitored residue characteristic(s). For example, as indicated above, the monitored residue characteristic(s) may correspond to the percent residue coverage of the portion of the field in front of the residue removal device. In such an embodiment, the controller may be configured to compare the monitored percent residue coverage to a predetermined minimum and/or maximum residue coverage value(s). Thereafter, when the monitored percent residue coverage exceeds the maximum residue coverage value, the controller may be configured to control an actuator to increase the pressure applied to the soil by the residue removal device. The increase in the pressure applied to the soil may, in turn, increase the aggressiveness of the residue removal device to sweep away the increased residue in the path of the implement, thereby reducing the likelihood of residue entering the furrow. Conversely, when the monitored percent residue coverage falls below the minimum residue coverage value, the controller may be configured to control the actuator to decrease the pressure applied to the soil by the residue removal device. The reduction in the pressure applied to the soil may, in turn, decrease the aggressiveness of the residue removal device such that the device does not excessively engage the top soil.

Referring now to the drawings, FIG. 1 illustrates a perspective view of one embodiment of a seed-planting implement 10 in accordance with aspects of the present subject matter. It should be appreciated that, although the seed-planting implement 10 illustrated herein corresponds to a planter, the seed-planting implement 10 may generally correspond to any suitable equipment or implement, such as seeder or another seed-dispensing implement, a side dresser or another fertilizer-dispensing implement, a strip tiller, and/or the like.

Figure 2:
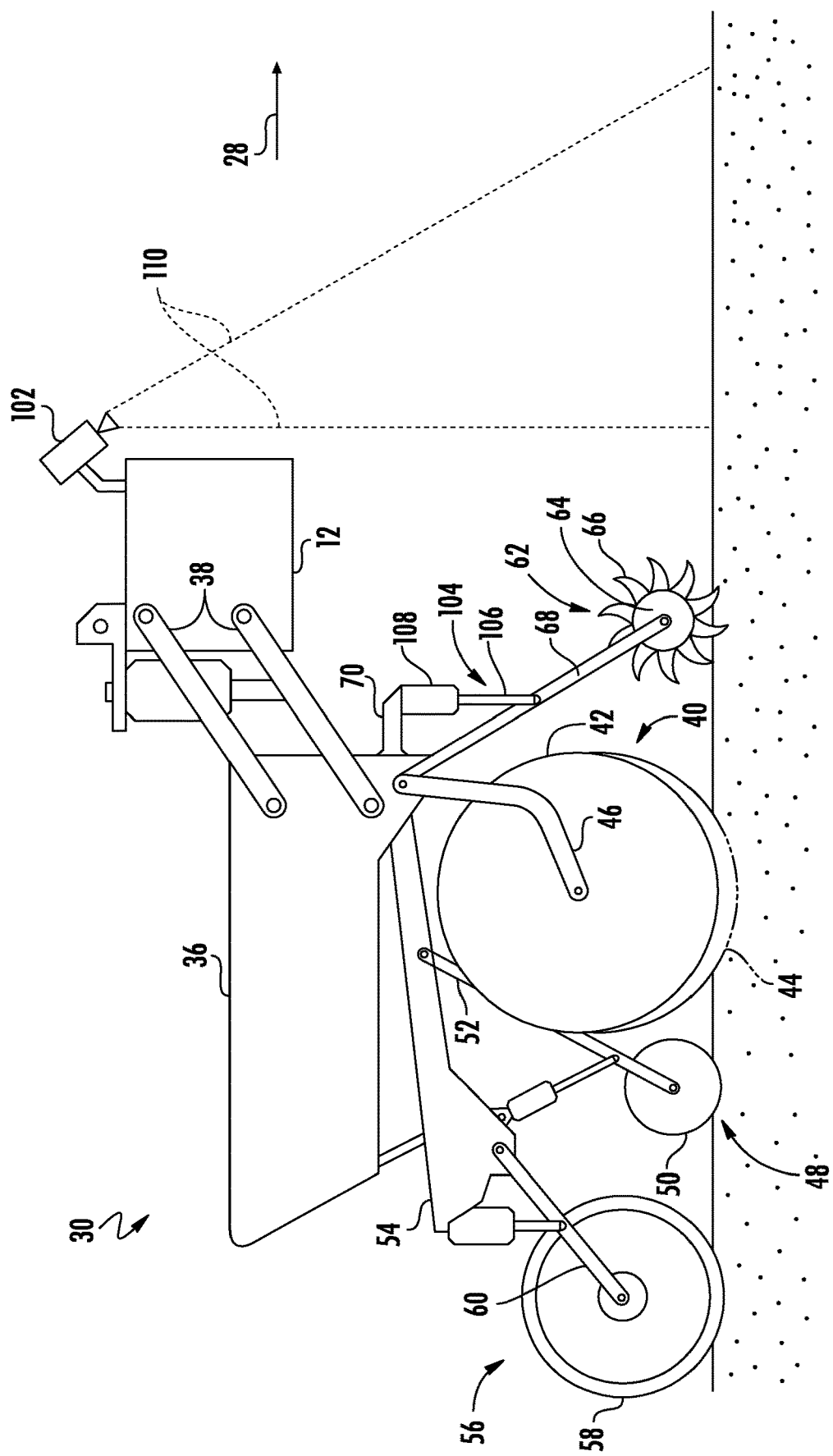
FIG. 2 illustrates a side view of one embodiment of a row unit of a seed-planting implement in accordance with aspects of the present subject matter.

As shown in FIG. 1, the implement 10 may include a toolbar 12 configured to support and/or couple to one or more components of the implement 10. Specifically, in several embodiments, the toolbar 12 may extend along a lateral direction 14 between a first side 16 of the implement 10 and a second side 18 of the implement 10. As shown, the toolbar 12 may include a center section 20, a first wing section 22, and a second wing section 24. In one embodiment, the wing sections 22, 24 may be pivotably coupled to the center section 20 in a manner that permits the wing sections 22, 24 to fold forward to reduce the lateral width of the implement 10, such as during storage or transportation of the implement 10 on a road. Furthermore, a tow bar 26 may be coupled to the center section 20 to allow the implement 10 to be towed by a work vehicle (not shown), such as an agricultural tractor, in a direction of travel (e.g., as indicated by arrow 28 in FIG. 1). Additionally, as shown in FIG. 2, the wing sections 22, 24 and the center section 20 may generally be configured to support a plurality of seed-planting units or row units 30. As will be described below, each row unit 44 may be configured to deposit seeds at a desired depth beneath the soil surface and at a desired seed spacing as the implement 10 is moved across the field, thereby establishing rows of planted seeds. In some embodiments, the bulk of the seeds to be planted may be stored in one or more hoppers or seed tanks 32 mounted on or otherwise supported by the toolbar 12. Thus, as seeds are planted by the row units 30, a pneumatic distribution system (not shown) may distribute additional seeds from the seed tanks 32 to the individual row units 30. Additionally, one or more fluid tanks 34 mounted on or otherwise supported by the toolbar 12 may store agricultural fluids, such as insecticides, herbicides, fungicides, fertilizers, and/or the like, which may be sprayed onto the seeds during planting.

It should be appreciated that, for purposes of illustration, only a portion of the row units 30 of the implement 10 have been shown in FIG. 1. In general, the implement 10 may include any number of row units 30, such as six, eight, twelve, sixteen, twenty-four, thirty-two, or thirty-six row units. In addition, it should be appreciated that the lateral spacing between row units 30 may be selected based on the type of crop being planted. For example, the row units 30 may be spaced approximately thirty inches from one another for planting corn, and approximately fifteen inches from one another for planting soybeans.

Furthermore, the implement 10 may include one or more sensors 102 coupled thereto and/or mounted thereon. As will be described below, each sensor 102 may be configured to capture data indicative of one or more residue characteristic (s) (e.g., a percent residue coverage and/or a residue size, shape, and/or type) associated with a portion of the field forward of the implement 10. For example, as shown, in one embodiment, a first sensor 102A may be mounted on the first wing section 22 of the toolbar 12 to capture data associated with a portion of the field disposed in front of the wing section 22 relative to the direction of travel 28. Similarly, as shown, a second sensor 102B may be mounted on the second wing section 24 of the toolbar 12 to capture data associated with a portion of the field disposed in front of the wing section 24 relative to the direction of travel 28. However, in alternative embodiments, the sensors 102A, 102B may be installed at any other suitable location(s) on the agricultural machine 10. Additionally, the implement 10 may include any other suitable number of sensors 102, such as a single sensor 102 or three or more sensors 102. For example, in one embodiment, the implement 10 may include a sensor 102 corresponding to each of the row units 30 such that the implement 10 includes as many sensors 102 as row units 30.

Referring now to FIG. 2, a side view of one embodiment of a row unit 30 is illustrated in accordance with aspects of the present subject matter. As shown, the row unit 30 may include a frame 36 adjustably coupled to the toolbar 12 by links 38. For example, one end of each link 38 may be pivotably coupled to the frame 36, while an opposed end of each link 38 may be pivotably coupled to the toolbar 12. In one embodiment, the links 36 may be parallel. However, in alternative embodiments, the row unit 30 may be coupled to the toolbar 12 in any other suitable manner.

As shown in FIG. 2, the row unit 18 also includes a furrow opening assembly 40. For example, in one embodiment, the furrow opening assembly 40 may include a gauge wheel 42 and one or more-disc openers 44 configured to excavate a furrow or trench in the soil. In general, the gauge wheel 42 may be configured to engage the top surface of the soil as the implement 10 is moved across the field. As such, the height of the disc opener(s) 44 may adjusted with respect to the position of the gauge wheel 42 to set the desired depth of the furrow being excavated. Furthermore, the furrow opening assembly 40 may include a support arm 46 configured to adjustably couple the gauge wheel 42 to the frame assembly 36. For example, one end of the support arm 46 may be pivotably coupled to the gauge wheel 42 and the disc opener(s) 44, while an opposed end of the support arm 46 may be pivotably coupled to the frame 36. Additionally, the disc opener(s) 44 may be coupled (e.g., bolted) to the frame 36. However, in alternative embodiments, the gauge wheel 42 and the disc opener(s) 44 may be coupled to the frame 36 in any other suitable manner.

Moreover, as shown, the row unit 30 may include a furrow closing assembly 48. Specifically, in several embodiments, the furrow closing assembly 48 may include a pair of closing discs 50 (only one of which is shown) positioned relative to each other in a manner that permits soil to flow between the discs 50 as the implement 10 is moved across the field. In this regard, the closing discs 50 may be configured to close the furrow after seeds have been deposited therein, such as by collapsing the excavated soil into the furrow. Furthermore, the furrow closing assembly 48 may include a support arm 52 configured to adjustably couple the closing discs 50 to the frame assembly 36. For example, one end of the support arm 52 may be pivotably coupled to the closing discs 50, while an opposed end of the support arm 52 may be pivotably coupled to a chassis arm 54, which is, in turn, coupled to the frame 36. However, in alternative embodiments, the closing discs 50 may be coupled to the frame 36 in any other suitable manner. Furthermore, in alternative embodiments, the furrow closing assembly 48 may include any other suitable number of closing discs 50, such as one closing disc 50 or three or more closing discs 50.

Additionally, the row unit 30 may include a press wheel assembly 56. Specifically, in several embodiments, the press wheel assembly 56 may include a press wheel 58 configured to roll over the closed furrow to firm the soil over the seed and promote favorable seed-to-soil contact. Furthermore, the press wheel assembly 56 may include a support arm 60 configured to adjustably couple the press wheel 58 to the frame assembly 36. For example, one end of the support arm 60 may be pivotably coupled to the press wheel 58, while an opposed end of the support arm 60 may be pivotably coupled to the chassis arm 54, which is, in turn, coupled to the frame 36. However, in alternative embodiments, the press wheel 58 may be coupled to the frame 36 in any other suitable manner.

Furthermore, a residue removal device 62 may be positioned at the forward end of the row unit 30 relative to the direction of travel 28. In this regard, the residue removal device 62 may be configured to break up and/or sweep away residue, dirt clods, and/or the like from the path of the row unit 30 before the furrow is formed in the soil. For example, in one embodiment, the residue removal device 62 may include one or more residue removal wheels 64, with each wheel 64 having a plurality of tillage points or fingers 66. As such, the wheel(s) 64 may be configured to apply a pressure to the soil such that the wheel(s) 64 roll relative to the soil as the implement 10 is moved across the field such that the fingers 66 break up and/or sweep away residue and dirt clods. Additionally, the residue removal device 62 may include a support arm 68 configured to adjustably couple the residue removal wheel(s) 64 to the frame assembly 36. For example, one end of the support arm 68 may be pivotably coupled to the wheel(s) 64, while an opposed end of the support arm 68 may be pivotably coupled to the frame 36. However, in alternative embodiments, the residue removal wheel(s) 64 may be coupled to the frame 36 in any other suitable manner. However, in alternative embodiments, the residue removal device 62 may have any other suitable configuration.

In several embodiments, a residue removal device actuator 104 may be configured to move or otherwise adjust the position of the residue removal device 62 relative to the frame 36 and/or apply a force to the residue removal device 62. For example, as shown, in one embodiment, a first end of the actuator 104 (e.g., a rod 106 of the actuator 104) may be coupled to the support arm 68 of the residue removal device 62, while a second end of the actuator 104 (e.g., the cylinder 108 of the actuator 104) may be coupled to a bracket 70, which is, in turn, coupled to the frame 36. The rod 106 of the actuator 104 may be configured to extend and/or retract relative to the cylinder 108 to adjust the position of the residue removal device 62 relative to the frame 36. Furthermore, the actuator 104 may be configured to apply a force to the residue removal device 62, which may, in turn, cause the device 62 to exert a pressure on the soil. In general, increasing the force applied to the residue removal wheel(s) 64 may increase the pressure applied to the soil by the residue removal device 62, thereby increasing the aggressiveness with which the wheel(s) 64 breaks up and sweeps away the residue and/or dirt clods. Conversely, decreasing the force applied to the residue removal wheel(s) 64 may decrease the pressure applied to the soil by the residue removal device 62, thereby decreasing the aggressiveness with which the wheel(s) 64 breaks up and sweeps away the residue and/or dirt clods. In certain instances, the force applied to residue removal device 62 by the actuator 104 may be a negative or lifting force to counteract the weight of the device 62. In the illustrated embodiment, the actuator 104 corresponds to a fluid-driven actuator, such as hydraulic or pneumatic cylinder. However, in alternative embodiments, the actuator 104 may correspond to any other suitable type of actuator, such as an electric linear actuator.

Additionally, other parameters of the residue removal device 62 may be adjustable. Specifically, in one embodiment, the ground contact profile (e.g., the area of contact between the residue removal wheel(s) 64 and the ground) may be adjustable. As such, the pressure applied to the soil by the residue removal device 62 may be varied without adjusting the force applied to the device 62 by the actuator 104. For example, increasing the ground contact profile (e.g., by adjusting the camber and/or castor of the wheel(s) 64) may effectively decrease the pressure applied to the soil by the residue removal device 62. Conversely, decreasing the ground contact profile (e.g., by adjusting the camber and/or castor of the wheel(s) 64) may effectively increase the pressure applied to the soil by the residue removal device 62. However, in alternative embodiments, any other suitable parameter of the residue removal device 62 may be adjusted.

As indicated above, the implement 10 may include one or more sensors 102 configured to capture data indicative of one or more residue characteristics associated with a portion of the field across which the implement 10 is traveling. Specifically, in several embodiments, each sensor 102 may be associated with one or more of the row units 30. In this regard, each sensor 102 may have a field of view or sensor detection zone (e.g., as indicated by dashed lines 112 in FIG. 2) directed towards a section of the field in forward of the residue removal device(s) 62 of the associated row unit(s) 30 relative to the direction of travel 28. As such, each sensor(s) 102 may be configured to capture data (e.g., vision-based or transceiver-based data) of the portion of the field in front of the associated residue removal device(s) 62. The captured data may, in turn, be indicative of the residue characteristic(s) (e.g., the percent residue coverage and/or residue size, shape, or type) that the associated residue removal device(s) 62 may encounter as the implement 10 is moved in the direction of travel 28. In the illustrated embodiment, the sensor(s) 102 corresponds to vision-based sensor(s), such as a camera(s). However, in alternative embodiments, the sensor(s) 102 may correspond to a suitable transceiver-based sensor(s) (e.g., a light detection and ranging (LIDAR) sensor(s), a radio detection and ranging (RADAR) sensor(s), and/or the like) or any other suitable sensing device(s) configured to detect or capture data indicative of the residue characteristic(s) of the section of the field within an associated field of view.

It should be further appreciated that the configuration of the seed-planting implement 10 described above and shown in FIGS. 1 and 2 is provided only to place the present subject matter in an exemplary field of use. Thus, it should be appreciated that the present subject matter may be readily adaptable to any manner of implement configuration.

Figure 3:
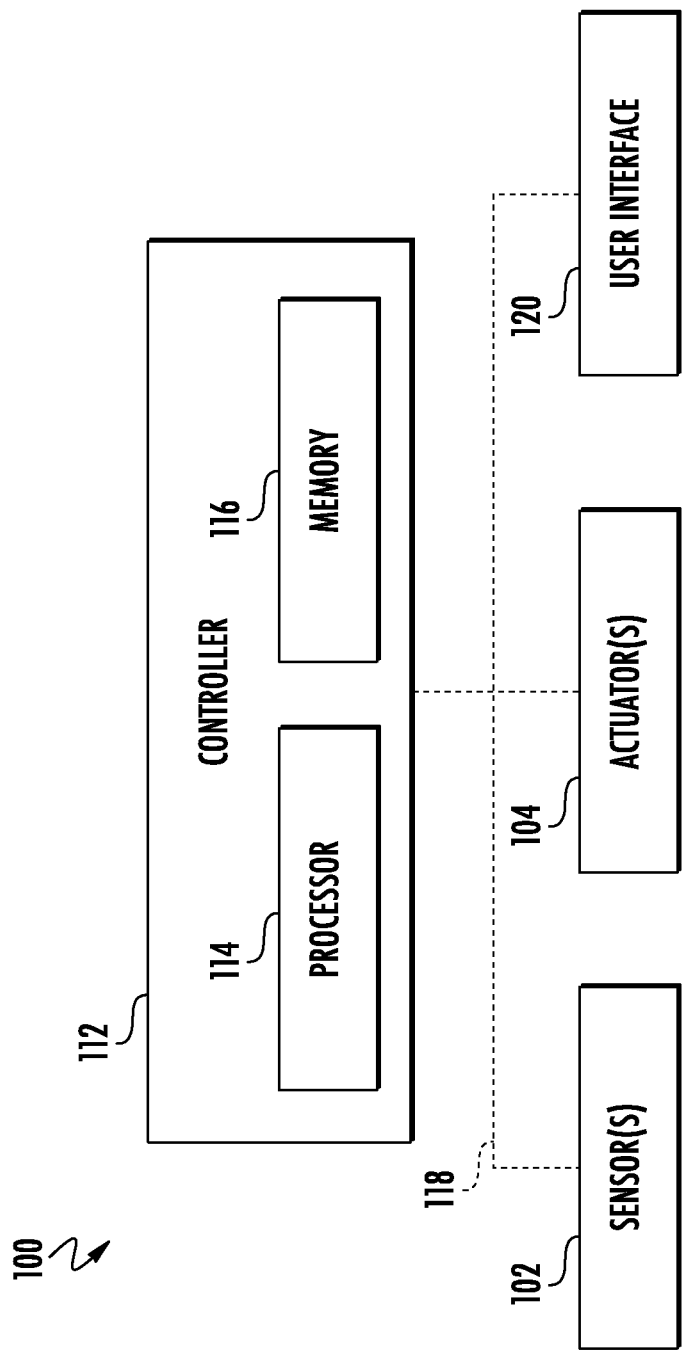
FIG. 3 illustrates a schematic view of one embodiment of a system for controlling the operation of a residue removal device of a seed-planting implement in accordance with aspects of the present subject matter.

Referring now to FIG. 3, a schematic view of one embodiment of a system 100 for controlling the operation of a residue removal device of a seed-planting implement is illustrated in accordance with aspects of the present subject matter. In general, the system 100 will be described herein with reference to the seed-planting implement 10 described above with reference to FIGS. 1 and 2. However, it should be appreciated by those of ordinary skill in the art that the disclosed system 100 may generally be utilized with seed-planting implements having any other suitable implement configuration.

As shown in FIG. 3, the system 100 may include a controller 112 positioned on and/or within or otherwise associated with the implement 10 or an associated work vehicle. In general, the controller 112 may comprise any suitable processor-based device known in the art, such as a computing device or any suitable combination of computing devices. Thus, in several embodiments, the controller 112 may include one or more processor(s) 114 and associated memory device(s) 116 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 116 of the controller 112 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 116 may generally be configured to store suitable computer-readable instructions that, when implemented by the processor(s) 114 configure the controller 112 to perform various computer-implemented functions.

In addition, the controller 112 may also include various other suitable components, such as a communications circuit or module, a network interface, one or more input/output channels, a data/control bus and/or the like, to allow controller 112 to be communicatively coupled to any of the various other system components described herein (e.g., the sensor(s) 102 and/or the actuator(s) 104). For instance, as shown in FIG. 3, a communicative link or interface 118 (e.g., a data bus) may be provided between the controller 112 and the components 102, 104 to allow the controller 112 to communicate with such components 102, 104 via any suitable communications protocol (e.g., CANBUS).

It should be appreciated that the controller 112 may correspond to an existing controller(s) of the implement 10 and/or the associated work vehicle, itself, or the controller 112 may correspond to a separate processing device. For instance, in one embodiment, the controller 112 may form all or part of a separate plug-in module that may be installed in association with the implement 10 and/or the work vehicle to allow for the disclosed systems to be implemented without requiring additional software to be uploaded onto existing control devices of the implement 10 and/or the work vehicle. It should also be appreciated that the functions of the controller 112 may be performed by a single processor-based device or may be distributed across any number of processor-based devices, in which instance such devices may be considered to form part of the controller 112. For instance, the functions of the controller 108 may be distributed across multiple application-specific controllers, such as an implement controller and/or the like.

Furthermore, in one embodiment, the system 100 may also include a user interface 120. More specifically, the user interface 120 may be configured to provide feedback (e.g., feedback associated with the operation of the residue removal device(s) 62) to the operator of the implement 10. As such, the user interface 120 may include one or more feedback devices (not shown), such as display screens, speakers, warning lights, and/or the like, which are configured to provide feedback from the controller 112 to the operator. The user interface 120 may, in turn, be communicatively coupled to the controller 112 via the communicative link 118 to permit the feedback to be transmitted from the controller 112 to the user interface 120. In addition, some embodiments of the user interface 120 may include one or more input devices (not shown), such as touchscreens, keypads, touchpads, knobs, buttons, sliders, switches, mice, microphones, and/or the like, which are configured to receive user inputs from the operator. In one embodiment, the user interface 120 may be mounted or otherwise positioned within a cab of the associated work vehicle. However, in alternative embodiments, the user interface 120 may be mounted at any other suitable location.

In several embodiments, the controller 112 may be configured to monitor the one or more residue characteristics associated with the field across which the implement 10 is traveling. As described above, the implement 10 may include one or more sensors 102, with each sensor 102 configured to capture data indicative of one or more residue characteristics associated with a portion of the field positioned within an associated detection zone 110. In this regard, the controller 112 may receive the sensor data from the sensor(s) 120 (e.g., via the communicative link 118). Thereafter, the controller 112 may be configured to process/analyze the received sensor data to determine or estimate the residue characteristic(s) associated with each portion of the field within one of the detection zones 110. For instance, the controller 112 may include a look-up table(s), suitable mathematical formula, and/or algorithms stored within its memory 116 that correlates the received sensor data to the residue characteristic(s). The monitored residue characteristic(s) data may then be stored within the memory 116 of the controller 112 or transmitted to the user interface 120 (e.g., via the communicative link 118) for display to the operator.

It should be appreciated that the monitored residue characteristic(s) may generally be indicative of the residue conditions that the residue removal device(s) 62 may encounter with continued movement of the implement 10 in the direction of travel 28. More specifically, as indicated above, the detection zone 110 of each sensor 102 may be directed at a portion of the field located in front of or otherwise forward of the residue removal device(s) 62. As such, the controller 112 may be configured to determine the residue characteristic(s) of the field directly in front of current location of the residue removal device(s) 62. In this regard, and as will be described below, the controller 112 may be able to proactively adjust one or more operating parameters (e.g., applied force, ground contact profile, and/or the like) of the residue removal device(s) 62 to accommodate changes in the residue conditions of the field before the device(s) 62 encounter such changed residue conditions.

Furthermore, it should be appreciated that the monitored residue characteristic(s) may be any suitable characteristic or parameter associated with the residue present within the detection zone(s) 110. For example, in several embodiments, the monitored residue characteristic(s) may include the percent residue coverage of and/or the type of residue (e.g., corn stalks, bean stubble, weeds, grasses, and/or the like) present within the portion of the field within the detection zone(s) 110. However, in alternative embodiments, monitored residue characteristic(s) may correspond to any other suitable residue characteristic(s)/parameter(s), such as the size and/or presence of residue bunches or clusters.

In accordance with aspects of the present subject matter, the controller 112 may be configured to control the operation of the residue removal device(s) 62 based on the monitored residue characteristic(s). In general, the desired aggressiveness of the residue removal device(s) 62 may be great enough to prevent residue from entering the furrow(s), but not so great as to sweep away the nutrient-rich topsoil adjacent to such furrow(s). As such, the desired aggressiveness may vary depending on the residue characteristic(s) at each location within the field. For example, when the percent residue coverage increases and/or certain types of residue are present within the field, such as large or highly elongated pieces of residue (e.g., because such residue pieces may be partially buried), it may be necessary to increase the aggressiveness of the residue removal device(s) 62 to prevent residue from entering the furrow(s). Conversely, when the percent residue coverage decreases and/or other types of residue are present within the field, such as small or short residue pieces, it may be necessary to decrease the aggressiveness of the residue removal device(s) 62 to prevent such device(s) 62 from sweeping away the nutrient-rich topsoil adjacent to the furrow(s). In this regard, as the implement 10 is moved across the field, the controller 112 may be configured to adjust one or more operating parameters of the residue removal device(s) 62 (e.g., the force applied to and/or the ground contact profile of the device(s) 62) to accommodate any changes in the monitored residue characteristic(s) of the field.

In several embodiments, the controller 112 may be configured to initiate one or more control actions when it is determined that the monitored residue characteristic(s) has fallen below an associated predetermined maximum residue characteristic value or exceeded an associated predetermined minimum residue characteristic value. Specifically, in such embodiments, the controller 112 may be configured to compare the values associated with the monitored residue characteristic(s) to the associated maximum and/or minimum residue characteristic value(s). Thereafter, when the values of the monitored residue characteristic(s) falls below the associated minimum residue characteristic value or exceeds the maximum residue characteristic value (thereby indicating that the residue characteristic(s) has changed in a manner that may require adjustment of the residue removal device(s) 62), the controller 112 may be configured to initiate one or more control actions.

In one embodiment, the controller 112 may be configured to notify the operator of implement 10 that the value(s) of the monitored residue characteristic(s) has fallen below the associated maximum residue characteristic value or exceeded the associated minimum residue characteristic value. Specifically, in such instances, the controller 112 may be configured to transmit instructions to the user interface 120 (e.g., the communicative link 118) instructing the user interface 120 to provide a notification to the operator of the implement 10 (e.g., by causing a visual or audible notification or indicator to be presented to the operator) indicating the value of the monitored residue characteristic(s) has fallen below the associated maximum residue characteristic value or exceeded the associated minimum residue characteristic value. In such instances, the operator may then choose to initiate any suitable corrective action he/she believes is necessary, such as adjusting the downforce applied to the residue removal device(s) 62.

Additionally, the controller 112 may be configured to actively control the operation of the residue removal device(s) 62 when it is determined the value(s) of the monitored residue characteristic(s) has fallen below the associated maximum residue characteristic value or exceeded the associated minimum residue characteristic value. For example, in one embodiment, the controller 112 may be configured to transmit instructions to the actuator(s) 104 (e.g., via the communicative link 118) instructing each actuator 104 to adjust the force applied to the corresponding residue removal device 62 by the actuator 104. For example, a pressure may be provided to a rod-side chamber or a cap-side chamber of each actuator 104 to adjust the force applied to the residue removal device 62. As indicated above, adjusting the force applied to each residue removal device 62 may, in turn, adjust the pressure applied to the soil by such device 62 (thereby adjusting the aggressiveness of the device 62). Furthermore, the position of the residue removal device 62 relative to the frame 36 may be adjusted, such as by extending and/or retracting the rod 106 of each actuator 104 relative to its cylinder 108. Additionally, the camber and/or castor of the residue removal wheel(s) 64 may be adjusted to vary the effective pressure applied to the soil by the corresponding residue removal devices 62. However, in alternative embodiments, the controller 112 may be configured to control any other suitable component(s) of the implement 10 to adjust any other suitable operating parameter of the residue removal device(s) 62.

As indicated above, in several embodiments, the monitored residue characteristic(s) may correspond the percent residue coverage of the portion of the field in front of the implement 10. In such embodiments, the controller 112 may be configured to compare the monitored percent residue coverage to a predetermined minimum percent residue coverage value and a predetermined maximum percent residue coverage value. Thereafter, when it is determined that the monitored percent residue coverage has fallen below the minimum percent residue coverage value (thereby indicating that percent residue coverage of the field has decreased such that the current pressure applied to the soil by the residue removal device 62 is too high), the controller 112 may be configured to control the actuator(s) 104 to decrease the force applied to the residue removal device(s) 62. Additionally, in such instances, the ground contact profile of the residue removal device(s) 62 may be increased. The decrease in the pressure applied to the soil by the residue removal device(s) 62 may reduce the aggressiveness of the device(s) 62 in a manner that prevents the device(s) 62 from sweeping away the topsoil adjacent to the furrow(s). Conversely, when it is determined that the monitored percent residue coverage has exceeded the maximum percent residue coverage value (thereby indicating that percent residue coverage of the field has increased such that the current pressure applied to the soil by the residue removal device 62 is too low), the controller 112 may be configured to control the actuator(s) 104 to increase the force applied to the residue removal device(s) 62. Additionally, in such instances, the ground contact profile of the residue removal device(s) 62 may be decreased. The increase in the pressure applied to the soil by the residue removal device(s) 62 may cause the device(s) 62 to more aggressively sweep away residue from the path of the implement 10 to prevent residue from entering the furrow(s).

Furthermore, in several embodiments, the controller 112 may be configured to control a plurality of the residue removal devices 62 of the implement 10 based on the data received from a single sensor 102. Specifically, in such embodiments, the detection zone 110 of each sensor 102 may directed to a portion of the field in front of a plurality of the row units 30. As such, the data captured by a single sensor 102 may be indicative of the residue conditions that a plurality of the residue removal devices 62 may encounter with continued movement of the implement 10. In this regard, as the implement 10 is moved across the field, the controller 112 may be configured to simultaneously adjust one or more operating parameters of a plurality of the residue removal devices 62 (e.g., the force applied to the devices 62) based on the residue characteristic values determined from data received from a single sensor 102. For example, as indicated above, in one embodiment, the first sensor 102A may be mounted on the first wing section 22 of the toolbar 12, while the second sensor 102B may be mounted on the second wing section 24 of the toolbar 12. In such embodiment, the controller 112 may be configured to control the residue removal devices 62 of the row units 30 mounted on the first wing section 22 based on sensor data received from the first sensor 102A. Similarly, the controller 112 may be configured control the residue removal devices 62 of the row units 30 mounted on the second wing section 24 based on sensor data received from the second sensor 102B. However, in alternative embodiments, any number of residue removal devices 62 may be controlled based on the data received from each sensor 102. For example, in one embodiment, each sensor 102 may correspond to a single residue removal device 62 such that each residue removal device 62 may be controlled based on data received from a single sensor 102.

Additionally, in one embodiment, the controller 112 may be configured to generate a field map based on the determined residue characteristic(s). More specifically, as the implement 10 is moved across the field, the controller 112 may be configured to receive location data (e.g., coordinates) from a location sensor (e.g., via the communicative link 118). Based on the known dimensional configuration and/or relative positioning between the sensor(s) 102 and the location sensor, the controller 112 may be configured to geo-locate each residue characteristic determination within the field. For example, in one embodiment, the coordinates derived from the location sensor and determined residue characteristic(s) derived from the sensor 102 may each be time-stamped. In such an embodiment, the time-stamped data may allow the determined residue characteristic(s) to be matched or correlated to a corresponding set of location coordinates received or derived from the location sensor. Thereafter, the controller 112 may be configured to generate a field map (e.g., a graphical field map) illustrating the determined residue characteristic(s) at various positions within the field. For instance, the controller 112 may be configured to execute one or more algorithms stored within its memory 116 that generate the field map based on the determined residue characteristic values and the data received from the location sensor. In one embodiment, the controller 112 may be configured to transmit instructions to the user interface 120 (e.g., the communicative link 118) instructing the user interface 120 to display the field map (e.g., a graphical field map).

Referring now to FIG. 4, a flow diagram of one embodiment of a method 200 for controlling the operation of a residue removal device of a seed-planting implement is illustrated in accordance with aspects of the present subject matter. In general, the method 200 will be described herein with reference to the seed-planting implement 10 and the system 100 described above with reference to FIGS. 1-3. However, it should be appreciated by those of ordinary skill in the art that the disclosed method 200 may generally be implemented with any implement having any suitable implement configuration and/or any system having any suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (202), the method 200 may include receiving, with a computing device, sensor data indicative of a residue characteristic associated with a portion of a field within a detection zone positioned forward of a residue removal device relative to a direction of travel of a seed-planting implement. For instance, as described above, the controller 112 may be configured to receive sensor data from one or more sensors 102 of the implement 10, an associated work vehicle, or another implement (e.g., a field cultivator). Such data may, in turn, be indicative of one or more residue characteristics associated with a portion(s) of the field within a detection zone(s) 110 of the sensor(s) 102, with such detection zone(s) 110 being positioned forward of a residue removal device(s) 62 of the implement 10 relative to the direction of travel 28.

Additionally, at (204), the method 200 may include monitoring, with the computing device, the residue characteristic associated with the portion of the field within the detection zone based on received sensor data. For instance, as described above, the controller 112 may be configured to monitor the residue characteristic(s) associated with the portion(s) of the field within the detection zone(s) 110 based on data received from the sensor(s) 102.

Moreover, as shown in FIG. 4, at (206), the method 200 may include controlling, with the computing device, the operation of the residue removal device based on the monitored residue characteristic. For instance, as described above, the controller 112 may be configured to control the operation of the residue removal device(s) 62 (e.g., by controlling the operation of the associated actuator(s) 104) based on the monitored residue characteristic(s).

It is to be understood that the steps of the method 200 are performed by the controller 112 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 112 described herein, such as the method 200, is implemented in software code or instructions which are tangibly stored on a tangible computer readable medium. The controller 112 loads the software code or instructions via a direct interface with the computer readable medium or via a wired and/or wireless network. Upon loading and executing such software code or instructions by the controller 112, the controller 112 may perform any of the functionality of the controller 112 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for controlling the operation of a residue removal device of a seed-planting implement, the system comprising:
    a residue removal device configured to remove residue from a path of the seed-planting implement;
    a sensor configured to capture data indicative of a residue coverage of a portion of a field within a detection zone positioned forward of the residue removal device relative to a direction of travel of the seed-planting implement; and
    a controller communicatively coupled to the sensor, the controller configured to monitor the residue coverage of the portion of the field within the detection zone based on data received from the sensor, the controller further configured to control the operation of the residue removal device based on the monitored residue coverage.

2. The system of claim 1, wherein the controller is further configured to monitor the residue coverage relative to at least one of a predetermined maximum residue coverage value or a predetermined minimum residue coverage value and initiate a control action associated with adjusting the operation of the residue removal device when the monitored residue coverage value exceeds the predetermined maximum residue coverage value or falls below the predetermined minimum residue value.

3. The system of claim 2, wherein the control action comprises adjusting a pressure applied to soil within the field by the residue removal device.

4. The system of claim 2, wherein the control action comprises notifying an operator of the seed-planting implement that the monitored residue coverage has exceeded the predetermined maximum residue coverage value or fallen below the predetermined minimum residue coverage value.

5. The system of claim 1, wherein the controller is further configured to generate a field map based on the monitored residue coverage.

6. The system of claim 1, further comprising:
    a row unit frame of the seed-planting implement; and
    an actuator configured to adjust at least one of a position of the residue removal device relative to the row unit frame or a force applied to the residue removal device, the controller further configured to control the operation of the actuator to adjust the at least one of the position of the residue removal device or the force applied to the residue removal device based on the monitored residue coverage.

7. The system of claim 1, wherein the residue coverage comprises at least one of a percent residue coverage.

8. The system of claim 1, wherein the residue removal device corresponds to a first residue removal device, the system further comprising:
    a second residue removal device configured to remove residue from the path of the seed-planting implement, the controller further configured to control the operation of the second residue removal device based on the monitored residue coverage.

9. The system of claim 1, wherein the sensor comprises a vision-based sensor.

10. A seed-planting implement, comprising:
a toolbar;
a first row unit coupled to the toolbar, the first row unit including a first residue removal device configured to remove residue from a path of the first row unit;
a second row unit coupled to the toolbar, the second row unit including a second residue removal device configured to remove residue from a path of the second row unit;
a sensor configured to capture data indicative of a residue coverage of a portion of the field within a detection zone positioned forward of the first residue removal device and the second residue removal device relative to a direction of travel of the seed-planting implement; and
a controller communicatively coupled to the sensor, the controller configured to monitor the residue coverage of the portion of the field within the detection zone based on data received from the sensor, the controller further configured to control the operation of at least one of the first residue removal device or the second residue removal device based on the monitored residue coverage.

11. The seed-planting implement of claim 10, wherein the sensor corresponds to a first sensor configured to capture data indicative of a first residue coverage associated with a first portion of the field within a first detection zone positioned forward of the first residue removal device relative to the direction of travel of the seed-planting implement, the system further comprising:
a second sensor configured to capture data indicative of a second residue coverage associated with a second portion of the field within a second detection zone positioned forward of the second residue removal device relative to the direction of travel of the seed-planting implement.

12. The seed-planting implement of claim 11, wherein the controller is further configured to:
monitor the first residue coverage associated with the first portion of the field within the first detection zone based on data received from the first sensor;
control the operation of the first residue removal device based on the monitored first residue coverage;
monitor the second residue coverage associated with the second portion of the field within the second detection zone based on data received from the second sensor; and
control the operation of the second residue removal device based on the monitored second residue coverage.

13. The seed-planting implement of claim 10, wherein the sensor is mounted on the toolbar.

14. A method for controlling the operation of a residue removal device of a seed-planting implement, the method comprising:
receiving, with a computing device, sensor data indicative of a residue coverage of a portion of a field within a detection zone positioned forward of the residue removal device relative to a direction of travel of the seed-planting implement;
monitoring, with the computing device, the residue coverage of the portion of the field within the detection zone based on received sensor data; and
controlling, with the computing device, the operation of the residue removal device based on the monitored residue coverage.

15. The method of claim 14, wherein monitoring the residue coverage comprises monitoring, with the computing device, the residue coverage relative to at least one of a predetermined maximum residue coverage value or a predetermined minimum residue coverage value, the method further comprising:
initiating, with the computing device, a control action associated with adjusting the operation of the residue removal device when the monitored residue coverage value exceeds the predetermined maximum residue coverage value or falls below the predetermined minimum residue coverage value.

16. The method of claim 15, wherein the control action comprises adjusting a pressure applied to soil within the field by the residue removal device.

17. The method of claim 15, wherein the control action comprises notifying an operator of the seed-planting implement that the monitored residue coverage has exceeded the predetermined maximum residue coverage value or fallen below the predetermined minimum residue coverage value.

18. The method of claim 14, further comprising: generating, with the computing device, a field map based on the monitored residue coverage.

19. The method of claim 14, wherein the seed-planting implement includes an actuator configured to adjust at least one of a position of the residue removal device relative to a row unit frame of the seed-planting implement or a force applied to the residue removal device, the method further comprising:
controlling, with the computing device, the operation of the actuator to adjust the at least one of the position of the residue removal device or the force applied to the residue removal device based on the monitored residue coverage.

20. The method of claim 14, wherein the residue removal device corresponds to a first residue removal device of the seed-planting implement, the seed-planting implement including a second residue removal device, the method further comprising:
controlling, with the computing device, the operation of the second residue removal device based on the monitored residue coverage.

* * * * *